United States Patent
Merkel

(10) Patent No.: US 9,983,668 B2
(45) Date of Patent: May 29, 2018

(54) GAZE DETECTOR USING REFERENCE FRAMES IN MEDIA

(71) Applicant: HEWLETT-PACKARD DEVELOPMENT COMPANY, L.P., Houston, TX (US)

(72) Inventor: Harold Merkel, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days. days.

(21) Appl. No.: 15/303,546

(22) PCT Filed: Apr. 29, 2014

(86) PCT No.: PCT/US2014/035921
§ 371 (c)(1),
(2) Date: Oct. 12, 2016

(87) PCT Pub. No.: WO2015/167471
PCT Pub. Date: Nov. 5, 2015

(65) Prior Publication Data
US 2017/0039719 A1    Feb. 9, 2017

(51) Int. Cl.
*G06K 9/00* (2006.01)
*G06F 3/01* (2006.01)
*G06T 7/00* (2017.01)

(52) U.S. Cl.
CPC ........... *G06F 3/013* (2013.01); *G06T 7/0044* (2013.01); *G06T 2207/30201* (2013.01)

(58) Field of Classification Search
None
See application file for complete search history.

(56) References Cited

U.S. PATENT DOCUMENTS

| 7,682,026 | B2 | 3/2010 | Huffman et al. |
| 8,077,915 | B2 | 12/2011 | Thorn |
| 2003/0123027 | A1 | 7/2003 | Amir et al. |
| 2008/0186449 | A1 | 8/2008 | Sur et al. |
| 2009/0268045 | A1* | 10/2009 | Sur .................... G06K 9/00604 348/222.1 |
| 2011/0069277 | A1 | 3/2011 | Blixt et al. |
| 2011/0085139 | A1 | 4/2011 | Blixt |
| 2011/0175904 | A1 | 7/2011 | van Baar et al. |
| 2011/0182472 | A1 | 7/2011 | Hansen |
| 2012/0019662 | A1 | 1/2012 | Maltz |

(Continued)

FOREIGN PATENT DOCUMENTS

| TW | 200741621 A | 11/2007 |
| TW | 201035813 A | 10/2010 |
| TW | 201314263 A | 4/2013 |

OTHER PUBLICATIONS

Li, F. et al., A Model-based Approach to Video-based Eye Tracking, Feb. 16, 2007, 29 pages, http://www.cis.rit.edu/~pelz/publications/Li_Kolakowski_Pelz_2007.pdf.

*Primary Examiner* — Stephen Coleman
(74) *Attorney, Agent, or Firm* — HPI Patent Department

(57) ABSTRACT

Examples are directed to a gaze detector using reference frames in media. One example includes inserting reference frames between frames of media presented on a display at a first frequency, analyzing images of reflections of the reference frames, and determining a portion of the media that is being viewed by a user based on the reflections of the reference frames from a user.

13 Claims, 14 Drawing Sheets

(56) References Cited

U.S. PATENT DOCUMENTS

| | | |
|---|---|---|
| 2012/0162603 A1 | 6/2012 | Dejima |
| 2012/0274902 A1 | 11/2012 | Baranton et al. |
| 2013/0002846 A1 | 1/2013 | De Bruijn et al. |
| 2013/0107207 A1 | 5/2013 | Zhao et al. |
| 2013/0135198 A1 | 5/2013 | Hodge et al. |
| 2015/0155009 A1* | 6/2015 | Mate .................... G11B 27/036 386/278 |

* cited by examiner

US 9,983,668 B2

GAZE DETECTOR USING REFERENCE FRAMES IN MEDIA

BACKGROUND

In many instances, users control electronic devices (e.g., computers, tablet computers, laptop computers, mobile phones, etc.) using input devices (e.g., a mouse, a keyboard, a trackball, a touchscreen, etc.) controlled by their hands, fingers, etc. In some examples, eye tracking systems may be used to control electronic devices. In such examples, the electronic device may include or utilize a gaze detection system that determines a gaze direction of the user.

DETAILED DESCRIPTION

Figure 1:
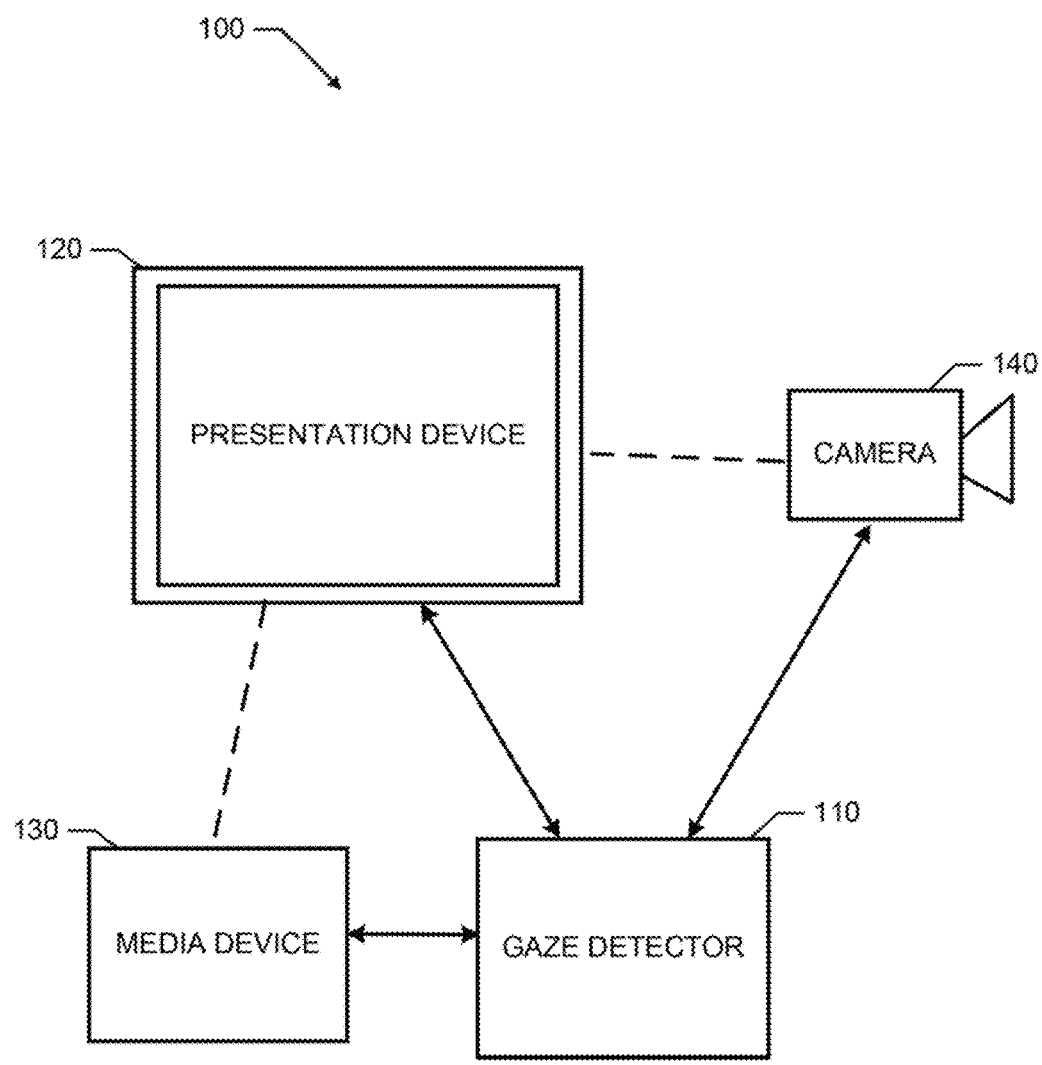
FIG. 1 is a schematic diagram of a gaze detection system including an example gaze detector constructed in accordance with the teachings of this disclosure.

Example eye tracking systems and/or gaze detection systems may provide fixed illumination points (e.g., infrared light emitting diodes (LEDs)) at known locations relative to a camera, also at a fixed, known location (for example on a head mounted apparatus and/or on a remote system of a device). In such examples, a camera image detects reflections of the illumination points in a user's eyes and calculations based on the known locations of the illumination points and/or camera to determine the gaze direction.

In examples disclosed herein, a gaze detector is provided that enables for dynamic use of illumination points through reference frames presented on a presentation device. Accordingly, examples disclosed herein allow a gaze detector, constructed in accordance with the teachings of this disclosure, to adjust illumination points based on an environment and/or head location of a user to determine a gaze direction of the user. Examples disclosed herein involve utilizing a presentation device that is presenting media to present illumination points on reference frames inserted between frames of media presented on the presentation device.

An example apparatus includes a reference frame manager, an image manager, and a gaze analyzer to determine a gaze direction and/or portion of media being viewed by a user. In examples disclosed herein, the reference frame manager inserts reference frames into media at a frequency between media frames of the media, and the image manager identifies images captured by a camera that include reflections of the reference frames from a user. Furthermore, in examples disclosed herein, the gaze analyzer determines a gaze direction and/or a portion of media that is being viewed by the user based on the images of the reflections.

In some examples disclosed herein, a gaze detector analyzes conditions of an environment of a gaze detector and adjust settings of the gaze detector and/or reference frames used by the gaze detector to determine a gaze direction of a user and/or a portion of media being viewed by a user. In some examples disclosed herein, a gaze detector compares a location of a reference frame viewed by a user to a corresponding location of a media frame to determine an object at the corresponding location that is being viewed by the user. In some such examples, the reference frame is presented on a presentation device immediately before or after the media frame is presented on the presentation device.

As used herein, a gaze direction is an angle and/or direction where a user is looking or appears to be looking. For example, if a user is looking at an object on the ground, the gaze direction may be the direction from the user's eyes (or head) to the object. As used herein, media may be any content and/or image displayed on a presentation device. Examples of media may include but are not limited to an electronic device display, a movie, a television program, etc. For example, the media may be a display of a computer and/or tablet computer that is viewed and/or accessible by a user. As used herein, a frame of media or media frame is a display frame of the media that may include images, icons, text, video frames, image frames, etc. For example, media presented at a frequency of 60 Hz may present 60 media frames per second.

FIG. 1 is a schematic diagram of an example gaze detection system 100 that may be used to determine a gaze direction of a user and/or a portion of media being viewed by the user. The gaze detection system 100 of FIG. 1 includes an example gaze detector 110, a presentation device 120, a media device 130, and a camera 140. In the illustrated example of FIG. 1, the gaze detector 110, the presentation device 120, the media device 130, and/or the camera 140 may be collocated on a single device (e.g., a laptop computer, a tablet computer, a smartphone, a desktop computer)

and/or may be located on separate devices from one another. The gaze detector 110 communicates with the presentation device 120, the media device 130, and/or the camera 140 to determine a user's gaze direction in accordance with the teachings of this disclosure.

The presentation device 120 of FIG. 1 may be any type of display device (e.g., a light emitting diode (LED), an organic light emitting diode (OLED), a liquid crystal display (LCD), a cathode ray tube display (CRT), a touchscreen, a tactile output device, etc.). For example, the presentation device 120 may be a touchscreen of a tablet computer or a monitor of a desktop computer. The presentation device 120, as disclosed herein, presents media from the media device 130 and reference frames from the gaze detector 110. In some examples, the media from the media device 130 is provided to the presentation device 120 via the gaze detector 110. As further disclosed below, the gaze detector 110 inserts (e.g., interlaces) the reference frames between frames of media from the media device 130.

In the illustrated example of FIG. 1, the media device 130 may be any type of media device 130, such as a laptop computer, a tablet computer, a desktop computer, a set top box, a digital video recorder (DVR), a game console, a DVD player, a BluRay™ player, etc. In some examples, the media device 130 is a graphics driver of a computer, tablet computer, smartphone, etc. Additionally or alternatively, the media device 130 may receive media from a media provider (e.g., a cable provider, a satellite provider) and/or a communication network (e.g., the Internet). Accordingly, the media device 130 generates, received, and/or provides media for display on the presentation device 120. The gaze detector 110 may be communicatively coupled with the media device 130 in parallel with the presentation device 120 and/or in series between the presentation device 120 and the media device 130. Accordingly, the gaze detector 110 may access the media device 130 to insert reference frames between media frames such that the presentation device 120 displays the media frames and/or reference frames.

The camera 140 of the gaze detection system 100 of FIG. 1 may be any type of camera (e.g., single shot, video, webcam, etc.). For example the camera 140 may be a camera of a laptop computer, tablet computer, smartphone, etc. The example camera 140 of FIG. 1, as used herein by the gaze detector 110, captures images of a user. The camera 140 may provide the images of the user to the gaze detector 110 to determine a gaze direction and/or portion of media being viewed by the user. As further disclosed below, the camera 140 captures images of reflections of the reference frames from the user (e.g., from eye(s) of the user, from eyewear of the user, etc.).

Accordingly, as disclosed herein, the gaze detector 110 of the illustrated example of FIG. 1 utilizes the presentation device 120, the media device 130, and/or the camera 140 to determine a gaze direction of a user and/or determine a portion of media provided by the media device 130 that is being viewed by the user.

Figure 2:
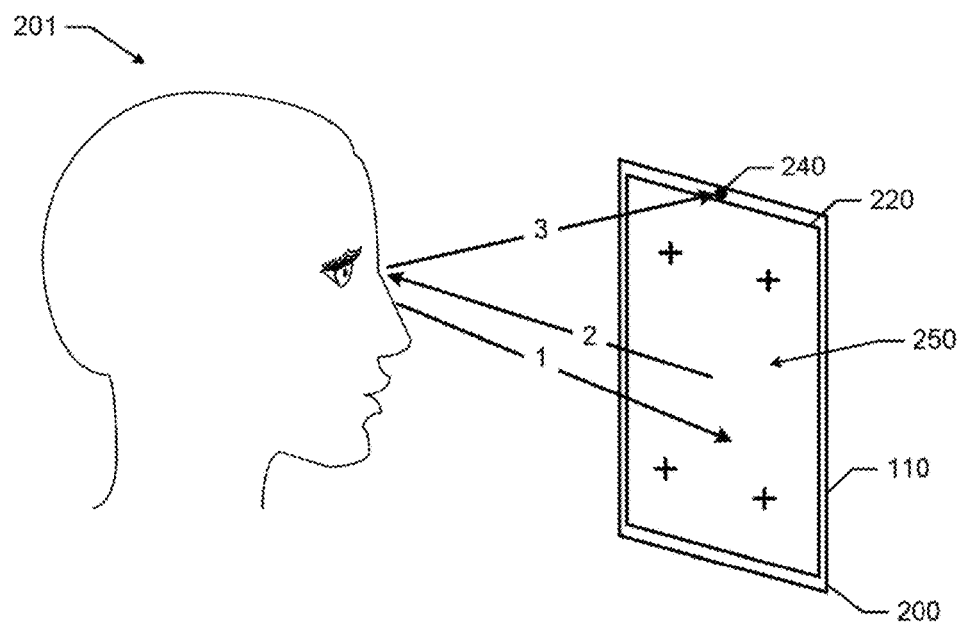
FIG. 2 illustrates three events that provide information to an example gaze detector, which may be implemented by the gaze detector of FIG. 1, to determine a gaze direction and/or a portion of media being viewed by a user in accordance with the teachings of this disclosure.

FIG. 2 illustrates an example environment in which the gaze detection system 100 may be used and an example series of events analyzed in accordance with the teachings of this disclosure. In the illustrated example of FIG. 2, a tablet computer 200, which may be used to implement the gaze detection system 100 of FIG. 1, is being viewed by a user 201. In the illustrated example of FIG. 2 the tablet computer includes a touchscreen display 220 (which may be used to implement the presentation device 120 of FIG. 1) and a camera 240 (which may be used to implement the camera 140 of FIG. 1). Furthermore, the tablet computer 200 includes a gaze detector 110 (e.g., in the form of software, such as an application, executable program, etc.), which may be used to implement the gaze detector 110 of FIG. 1, and a media device (e.g., a graphics driver and/or media player of the tablet computer 200) that renders a display on the touchscreen display 220.

In the example of FIG. 2 three events, identified by numbered arrows, provide information to the gaze detector 110 to determine a gaze direction and/or a portion of media being viewed by the user 201. At Event 1, the user 201 is viewing the touchscreen 220. In the illustrated example of FIG. 2, the touchscreen 220 is displaying a reference frame 250. The gaze detector 110 in accordance with the teachings of this disclosure, inserted the reference frame 250 into media presented on the presentation device 220 prior to Event 1. At Event 2, the reference frame 250 includes illumination points that project toward the user 201 (e.g., toward the eyes of the user) from the presentation device 120. At Event 3, the reflection of the reference frame 250 from the touchscreen is reflected off the user 201 (e.g., off the user's eye) and captured by the camera 240. The camera 240 of FIG. 2 may then provide the captured image to the gaze detector 110 for analysis. Against this background, the teachings of this disclosure enable the gaze detector 110 to determine a gaze direction and/or a portion of media being viewed by a user.

Figure 3:
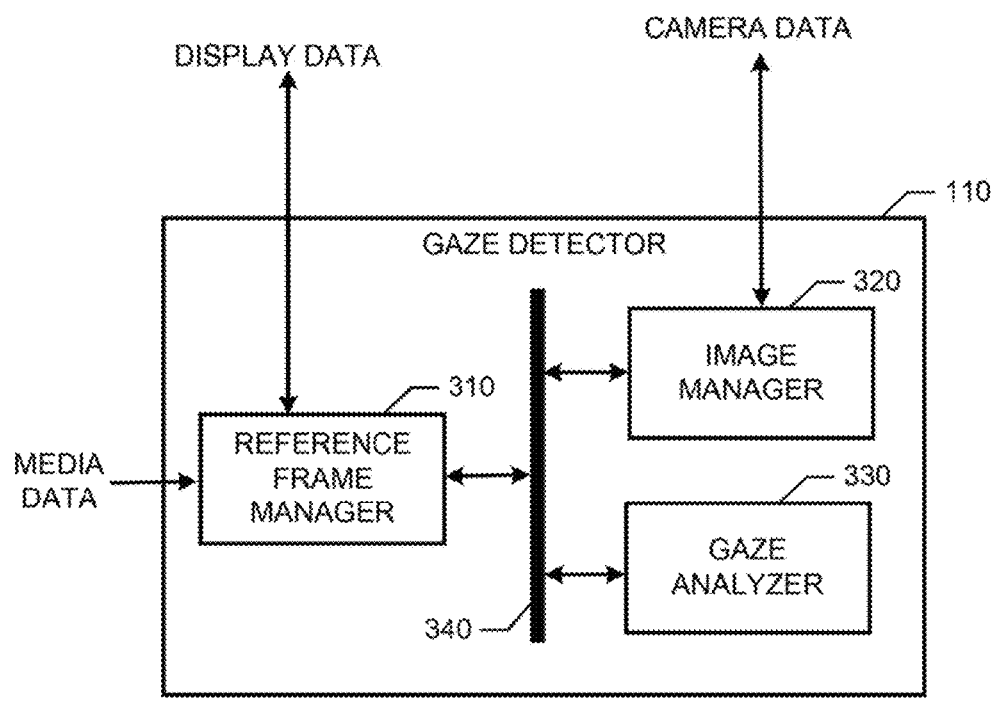
FIG. 3 is a block diagram of an example gaze detector that may be used to implement the gaze detector of FIG. 1.

FIG. 3 is a block diagram of an example gaze detector 110 that may be used to implement the gaze detector 110 of FIGS. 1 and/or 2. The gaze detector 110 of FIG. 3 determines a gaze direction of a user and/or a portion of media being viewed by a user in accordance with the teachings of this disclosure. In the illustrated example of FIG. 3, the gaze detector 110 includes a reference frame manager 310, an image manager 320, and a gaze analyzer 330. In FIG. 3, a communication bus 340 facilitates communication between the reference me manager 310, the image manager 320, and the gaze analyzer 330.

Figure 4A:
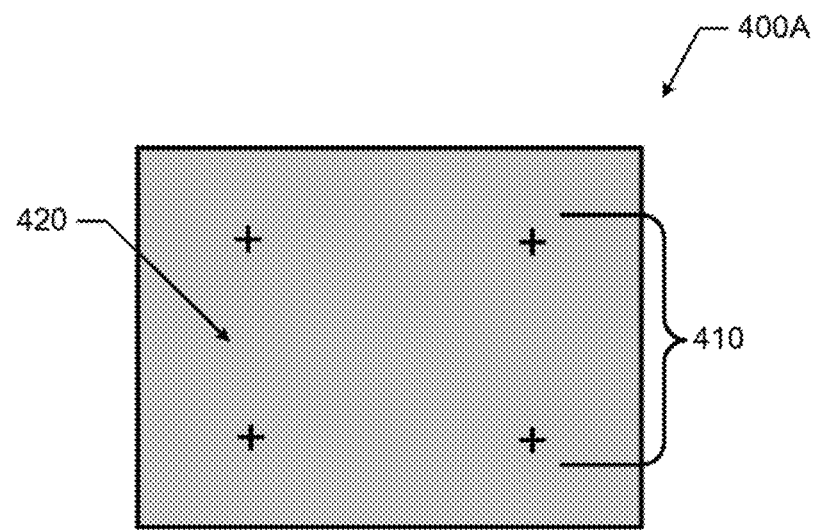
FIGS. 4A-4B illustrate example reference frames that may be used by the gaze detector of FIGS. 1 and/or 3.
Figure 4B:
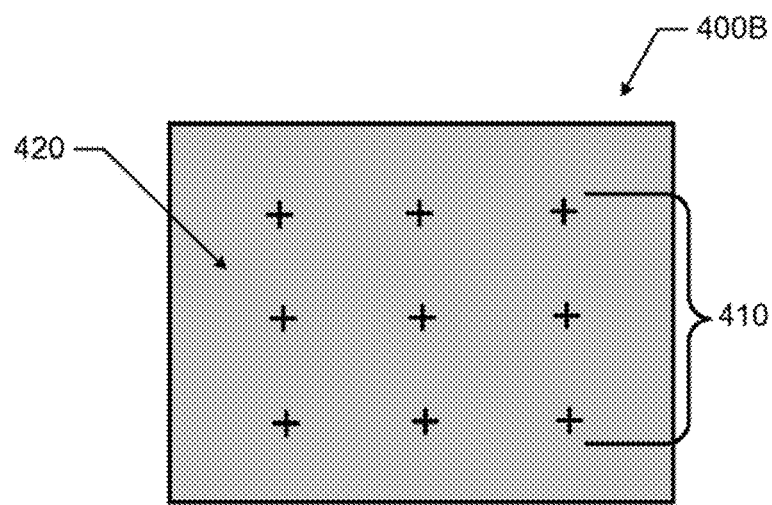

The example reference frame manager 310 of FIG. 3 manages reference frames that are displayed on the presentation device 120 of FIG. 1. As used herein, reference frames are display frames that are used for gaze direction analysis. Example reference frames 400A and 400B are illustrated in FIGS. 4A and 4B. The reference frames 400A 300B in the illustrated example of FIGS. 4A and 4B include illumination points 410 against a background 420. In the illustrated examples, the reference frame 400A includes 4 illumination points 410 and the reference frame 400B includes 9 illumination points. The example illumination points 410 may be any shape, size, and/or color (including infrared light). The reference frame manager 310 may create and/or insert reference frames into media received from the media device 130. In some examples, the reference frame manager 310 may adjust the settings for reference frames as disclosed below. As used herein, reference frames (e.g., the reference frames 400A, 400B of FIGS. 4A and 4B) use physical characteristics of a presentation device (e.g., the presentation device 120) to present illumination points (e.g., the illumination points 410) via the mechanisms (e.g., LEDs, LCDs, etc.) of the presentation device 120. Accordingly, for example, LEDs of a presentation device may form infrared illumination points by presenting corresponding red illumination points from a reference frame.

Additionally or alternatively, the reference frame manager 310 of FIG. 3 may identify candidate reference frames in the media that are to be used as reference frames, as disclosed below. Accordingly, the gaze detector 110 uses the reference frame manager to analyze media that is displayed on the presentation device 120. Furthermore, the reference frame manager 310 manages and/or controls illumination points of the reference frame(s) to provide more accurate detection capabilities and/or analysis for the gaze detector 110. An example implementation of the reference manager 310 is further described below in more detail in connection with FIG. 5.

The image manager 320 in the illustrated example of FIG. 3 manages communications and/or data to/from the camera 140 of FIG. 1. The example image manager 320 receives images from the camera 130 and/or sends control instructions to the camera 140. The image manager 320 of FIG. 3 analyzes received images (e.g., performs image processing) to detect reference frames and/or reflections of reference frames in the images. In some examples, the image manager 320 may receive a stream of images (e.g., recorded video). In such an example, the image manager 320 may filter out images including reflections of a reference frame from a user. For example, the image manager 320 may ignore images that do not include a reflection of a reference frame and keep images that include a reflection of a reference frame in a users eye or in a users eyewear. In some examples, the image manager 320 may analyze images received based on a frequency that reference frames are inserted into media. In some examples, the image manager 320 may edit (e.g., crop, zoom, enhance, etc.) to create more detailed, substantive, and/or clear images to be analyzed by the gaze analyzer 330. For example, the image manager 320 may crop an enhanced image of a users eye(s) from an image captured by the camera 140 to provide the gaze analyzer 330 with a most substantive portion(s) of the captured image (at least for gaze detection).

In some examples, the image manager 320 of FIG. 3 may instruct the camera 140 to adjust a frequency at which images are to be captured. For example, the image manager 320 may instruct the camera to capture images at a same frequency that reference frames are inserted into media by the reference frame manager 310. In such an example, the image manager 320 and the reference frame manager 310 may coordinate to synchronize when reference frames are presented by the presentation device 120 and when the camera 140 is to capture images of a user such that images of a user's eye(s) and/or eyewear include a reflection of the reference frames. Accordingly, the image manager 320 serves as an image processor and/or an interface for the camera 140. An example implementation of the image manager 320 of FIG. 3 is further described below in connection with FIG. 7.

The example gaze analyzer 330 of FIG. 3 analyzes data form the reference frame manager 310 and/or the image manager 330 to determine a gaze direction of a user. As disclosed herein, the gaze analyzer 330 analyzes reference frames that are presented by the presentation device 120. The gaze analyzer 330 receives the reference frames and/or information of the reference frames (e.g., illumination point pattern(s), illumination point color(s), illumination point size(s), illumination point location(s), etc.) from the reference frame manager 310. The gaze analyzer 330 of FIG. 3 receives images from the image manager 320 that were captured by the camera 140 of FIG. 1. As disclosed herein, the gaze analyzer 330 compares reference frame(s) (and/or information) received from the reference frame manager 310 to image(s) received from the image manager 320 to determine a gaze direction and/or a portion of media being viewed by a user. An example implementation of the gaze analyzer 330 of FIG. 3 is further described below in connection with FIG. 8.

While an example manner of implementing the gaze detector 110 of FIG. 1 is illustrated in FIG. 3, at least one of the elements, processes and/or devices illustrated in FIG. 3 may be combined, divided, re-arranged, omitted, eliminated and/or implemented in any other way. Further, the reference frame manage 310, the image manager 320, the gaze analyzer 330, and/or, more generally, the example gaze detector 110 of FIG. 3 may be implemented by hardware, software, firmware and/or any combination of hardware, software and/or firmware. Thus, for example, any of the reference frame manage 310, the image manager 320, the gaze analyzer 330, and/or, more generally, the example gaze detector 110 could be implemented by at least one of analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the reference frame manage 310, the image manager 320, and/or the gaze analyzer 330 is/are hereby expressly defined to include a tangible computer readable storage device or storage disk such as a memory, a digital versatile disk (DVD), a compact disk (CD), a Blu-ray disk, etc. storing the software and/or firmware. Further still, the example gaze detector 110 of FIG. 3 may include at least one element, process and/or device in addition to, or instead of, those illustrated in FIG. 3, and/or may include more than one of any or all of the illustrated elements, processes and devices.

Figure 5:
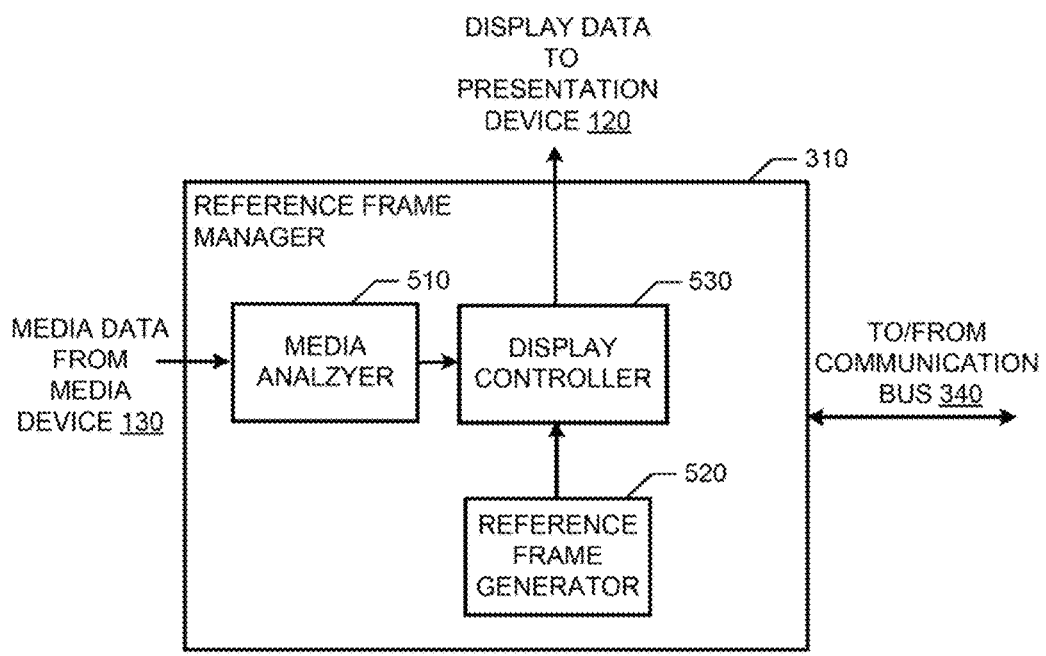
FIG. 5 is a block diagram of an example reference frame manager that may be implemented by the gaze detector of FIGS. 1 and/or 3.

FIG. 5 is a block diagram of an example reference frame manager 310 that may be used to implement the reference frame manager 310 of FIG. 3. The reference frame manager 310 of FIG. 5 manages reference frames that are presented by the presentation device 120 with and/or within media form the media device 130. In the illustrated example of FIG. 5, the reference frame manager 310 includes a media analyzer 510, a reference frame generator 520, and a display controller 530. In the illustrated example of FIG. 5, media from the media device 130 is received by the media analyzer 510 and forwarded to the display controller 530. The display controller 530 of FIG. 5 receives the media and/or reference frames from the reference frame generator 520 and provides the media and/or reference frames as display data to the presentation device 120. As used herein, display data and/or display frames refer(s) to data and/or frames including media frames and/or reference frames that are rendered and/or presented by a presentation device (e.g., the presentation device 120).

The media analyzer 510 of FIG. 5 analyzes media received and/or retrieved from the media device 130. The media analyzer 510 analyzes the media to identify characteristics of the media. For example, the media analyzer 510 may determine a frequency (e.g., frames per second) of the media. Such information may be useful in determining a ratio or percentage of display frames that may be reference frames relative to media frames. In some examples, the media analyzer 510 provides the determined information to the gaze analyzer 330 for gaze detection analysis. In some examples, the reference frame manager 310 may seek to insert reference frames into media in such a way that the reference frames are not detectable by a human. In such examples, if the reference frame manager 310 inserts reference frames too frequently into media presented by the presentation device 120 (e.g., the display data), a user's ability to appropriately view the media may be negatively affected. For example, inserting reference frames too frequently into display data may enable a user to detect the display of the reference frames on the presentation device 120, thus disrupting playback and/or clarity of the media. Accordingly, using the determined frequency of the media (e.g., frames per second), the reference frame manager 310 seeks to insert reference frames at a frequency that a user would not realize that the reference frame was presented.

Figure 6A:
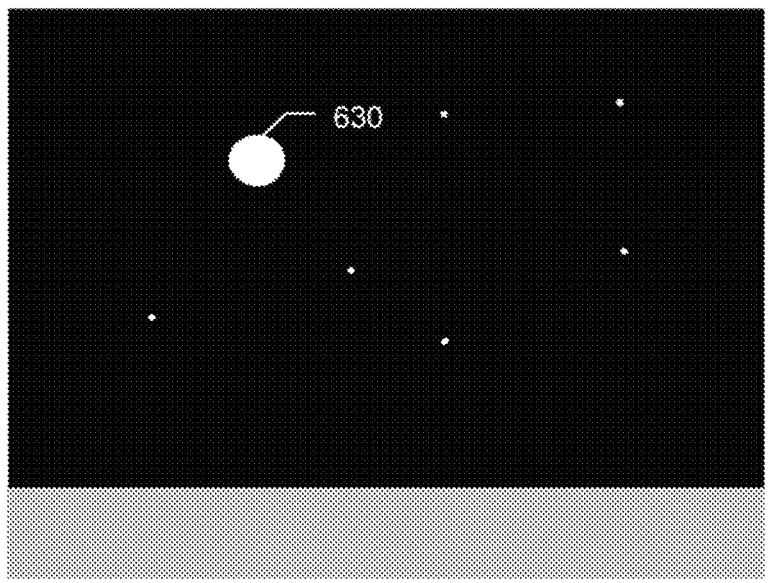
FIG. 6 illustrate examples of media frames that may be candidate reference frames for use by the gaze detector of FIGS. 1 and/or 3.
Figure 6B:
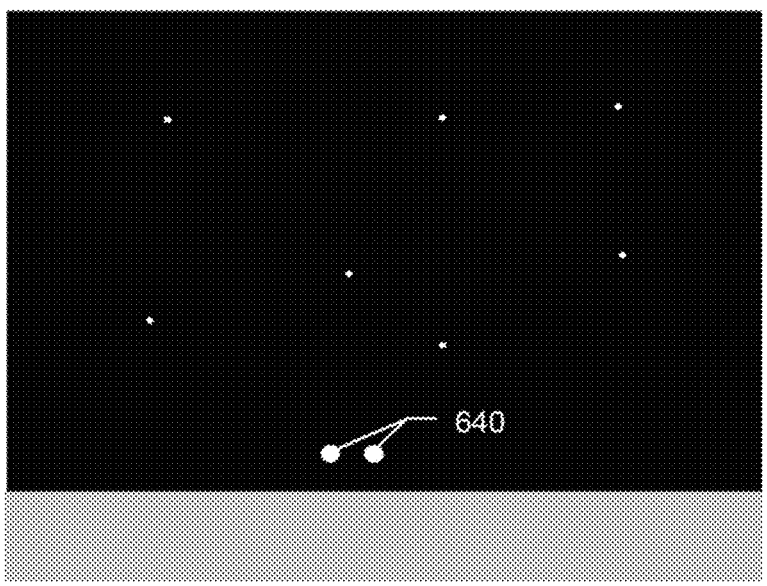

In some examples, the media analyzer 510 of FIG. 5 may analyze the media and/or media frames to identify illumination points inherently present within the media and/or media frames. For example, FIGS. 6A and 68 illustrate example first and second media frames 610 and 620, respectively. The first media frame 610 in the illustrated example of FIG. 6A includes an image of a night sky including a bright moon. In such an example, the media analyzer 510 may identify the bright moon as an illumination point 630. The second media frame 620 in the illustrated example of FIG. 6B includes an image of headlights of a vehicle. In such an example, the media analyzer 510 may identify the headlights as illumination points 640. In examples in which the media analyzer 510 identifies candidate illumination points and/or the gaze detector 110 is configured to use illumination points from media frames, the reference frame manager 310 may communicate locations (e.g., x, y coordinates) of the candidate illumination points 630, 640 to the gaze analyzer 330 for image analysis and/or determining a gaze direction of a user, as disclosed herein. Accordingly, as used herein illumination points inherently present within media frames may be referred to herein as illumination points of reference frames. Accordingly, the media analyzer 510 may analyze each frame of received media and enable the reference frame manager 310 and/or gaze detector 110 to dynamically manage reference frames used to determine a gaze direction and/or portion of media being viewed by a user, as disclosed herein.

In the illustrated example of FIG. 5, the reference frame generator 520 creates reference frames that are to be presented by the presentation device 120, reflected from a user (e.g., from a user's eye(s), eyewear, etc.), captured by the camera 140, and/or analyzed by the gaze analyzer 330. The reference frame generator 520 generates reference frames (e.g., the reference frames 400A, 4006 of FIGS. 4A and 4B, respectively) and provides the generated reference frames to the display controller 530. The reference frame generator 520 generates the reference frame based on an illumination point pattern, an illumination point size, an illumination point color, a background type a background color, etc. based on settings of a user and/or instructions from the gaze analyzer 330. In some examples, the reference frame generator 520 continuously awaits instructions from the gaze analyzer 330 to adjust settings (e.g., the illumination point pattern, illumination point size, illumination point color etc.) of the reference frames when the gaze analyzer 330 determines that an adjustment to reference frames would enhance gaze detection, as disclosed in further detail below in connection with the gaze analyzer 330 of FIG. 8. Accordingly, the reference frame generator 520 of FIG. 5 generates the reference frames presented by the presentation device 120 to determine a gaze direction of a user and/or a portion of media being viewed by the user.

The example display controller 530 of FIG. 5 generates display data from received media frames and/or reference frames. The display controller 530 provides display data and/or display frames to the presentation device 120, which renders the display data and/or display frames. Accordingly, the display controller 530 inserts reference frames into media. In some examples, the display controller 530 inserts a reference frame by replacing at least one media frame. In some examples, the display controller 530 inserts the reference frame between two media frames of the media. The display controller 530 inserts the reference frames and/or outputs display data according to user instructions and/or instructions received from the gaze analyzer 330. For example, the gaze analyzer 330, based on the frequency of the media determined by the media analyzer 510, may instruct the display controller 530 to increase or decrease a frequency of inserting reference frames into the display data.

Accordingly, the reference frame manager 310 of FIG. 5 manages reference frames used for gaze detection by the gaze detector 110. The reference frame manager 310 of FIG. 5 provides reference frame information, media information, and/or media frames via the communication bus 340.

While an example manner of implementing the reference frame manager 310 of FIG. 3 is illustrated in FIG. 5, at least one of the elements, processes and/or devices illustrated in FIG. 5 may be combined, divided, re-arranged, omitted, eliminated and/or implemented in any other way. Further, the media analyzer 510, the reference frame generator 520, the display controller 530, and/or, more generally, the example reference frame manager 310 of FIG. 5 may be implemented by hardware, software, firmware and/or any combination of hardware, software and/or firmware. Thus, for example, any of the media analyzer 510, the reference frame generator 520, the display controller 530, and/or, more generally, the example reference frame manager 310 could be implemented by at least one of analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the media analyzer 510, the reference frame generator 520, and/or the display controller 530 is/are hereby expressly defined to include a tangible computer readable storage device or storage disk such as a memory, a digital versatile disk (DVD), a compact disk (CD), a Blu-ray disk, etc. storing the software and/or firmware. Further still, the example reference frame manager 310 of FIG. 5 may include at least one element, process and/or device in addition to, or instead of, those illustrated in FIG. 5, and/or may include more than one of any or all of the illustrated elements, processes and devices.

Figure 7:
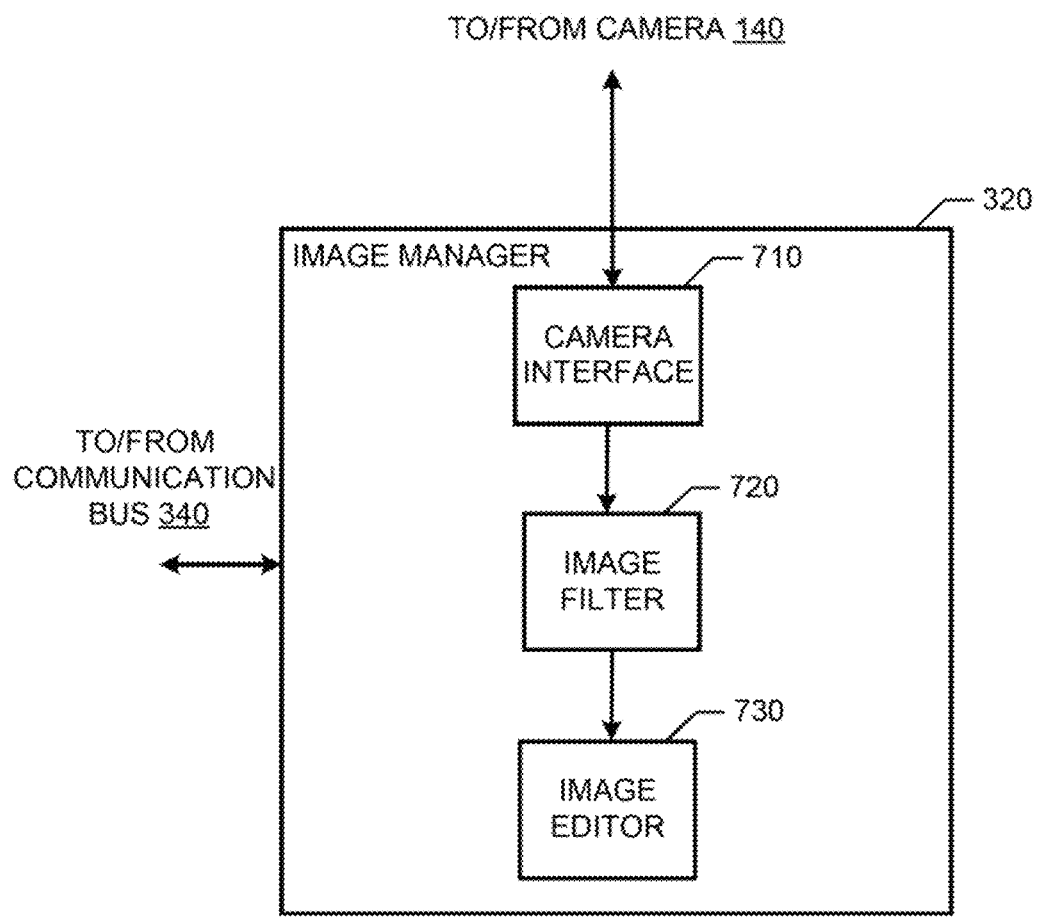
FIG. 7 is a block diagram of an example image manager that may be implemented by the gaze detector of FIGS. 1 and/or 3.

FIG. 7 is a block diagram of an example image manager 320 that may be used to implement the image manager 320 of FIG. 3. The image manager 320 of FIG. 7 manages images captured by the camera 140 and/or facilitates communication with the camera 140. In the illustrated example of FIG. 5, the image manager 320 includes a camera interface 710, an image filter 720, and an image editor 730. In the illustrated example of FIG. 7, images from the camera are received by the camera interface 710. In the illustrated example of FIG. 7, the camera interface 710 forwards the images to the image filter 720, which forwards filtered images to the image editor 730.

The example camera interface 710 of FIG. 7 may provide instructions to the camera 140 (and/or a controller of the camera 140) for capturing images of a user. For example, in response to receiving, via the communication bus 340, instructions from the gaze analyzer 330, the camera interface 710 may instruct the camera 140 to capture images at a designated frequency (e.g., a same frequency as or faster frequency than the frequency that the reference frame manager 310 is inserting reference frames into media (or display data)). In some examples, the camera interface 710 may instruct the camera 140 to stream captured images (e.g., record and/or provide video). In some examples, the camera interface 710 may provide more detailed capture instructions to the camera 140. For example, the camera interface 710 may instruct the camera 140 to use motion detection and/or facial recognition to capture images focused on and/or centered on a user or a user's face and/or eye(s). In some examples, the camera interface 710 may provide all images captured by the camera 140 to the gaze analyzer 330 for analyzing conditions of a user environment, as described in further detail below in connection with FIG. 8.

The image filter 720 of the illustrated example of FIG. 7 analyzes images to identify images that may be analyzed for gaze detection by the gaze analyzer 330. Accordingly, the image filter 720 identifies images from the camera 140 that include reflections of reference frames from the user (e.g., from the user's eye(s) and/or eyewear). Thus, the image filter 720 may receive filter instructions to identify particular illumination points and/or reference frame characteristics from the reference frame manager 310 and/or gaze analyzer 330. In some examples, time synchronization information may be included in filtering instructions indicating a time period during which the image filter 720 is to begin and/or end filtering images to identify the reference frames based on when the reference frames were inserted into the media. Based on the received instructions, the image filter 720 identifies corresponding images of reflections from a user in the images received from the camera 140. For example, the image filter 720 determines that a particular illumination point and/or illumination point pattern is to be identified in a reflection from an eye of a user. The image filter 720 of FIG. 7 may delete, remove, and/or ignore images that do not include a reflection of a reference frame. In some examples the image filter 720 forwards images that include reflections of reference frames to the image editor 730. Additionally or alternatively, the image filter 720 may provide the images that include the reflections of reference frames to the gaze analyzer 330 via the communication bus 340.

In the illustrated example of FIG. 7, the image editor 730 may refine images from the image filter 720. In some examples, the image editor 730 may receive all images captured by the camera 140 and/or received by the camera interface 710. The example image editor 730 may crop, enlarge, enhance etc. images for analysis. For example, the image editor 730 may perform image processing to identify portions of the images that are of interest for gaze detections (e.g., eye(s) and/or face of a user). The image editor 730 may then generate new images from cropped portions of the images captured by the camera 140. Such new images may be enlarged, enhanced (e.g. focused), etc. by the image editor 730. Accordingly, the image editor 730 may provide enhanced images to the gaze analyzer 330 for increased accuracy in analyzing reflections of the reference frames and/or illumination points from a user.

While an example manner of implementing the image manager 320 of FIG. 3 is illustrated in FIG. 7, at least one of the elements, processes and/or devices illustrated in FIG. 7 may be combined, divided, re-arranged, omitted, eliminated and/or implemented in any other way. Further, the camera interface 710, the image filter 720, the image editor 730, and/or, more generally, the example image manager 320 of FIG. 7 may be implemented by hardware, software, firmware and/or any combination of hardware, software and/or firmware. Thus, for example, any of the camera interface 710, the image filter 720, the image editor 730, and/or, more generally, the example image manager 320 could be implemented by at least one of analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the camera interface 710, the image filter 720, and/or the image editor 730 is/are hereby expressly defined to include a tangible computer readable storage device or storage disk such as a memory, a digital versatile disk (DVD), a compact disk (CD), a Blu-ray disk, etc. storing the software and/or firmware. Further still, the example image manager 320 of FIG. 7 may include at least one element, process and/or device in addition to, or instead of, those illustrated in FIG. 7, and/or may include more than one of any or all of the illustrated elements, processes and devices.

Figure 8:
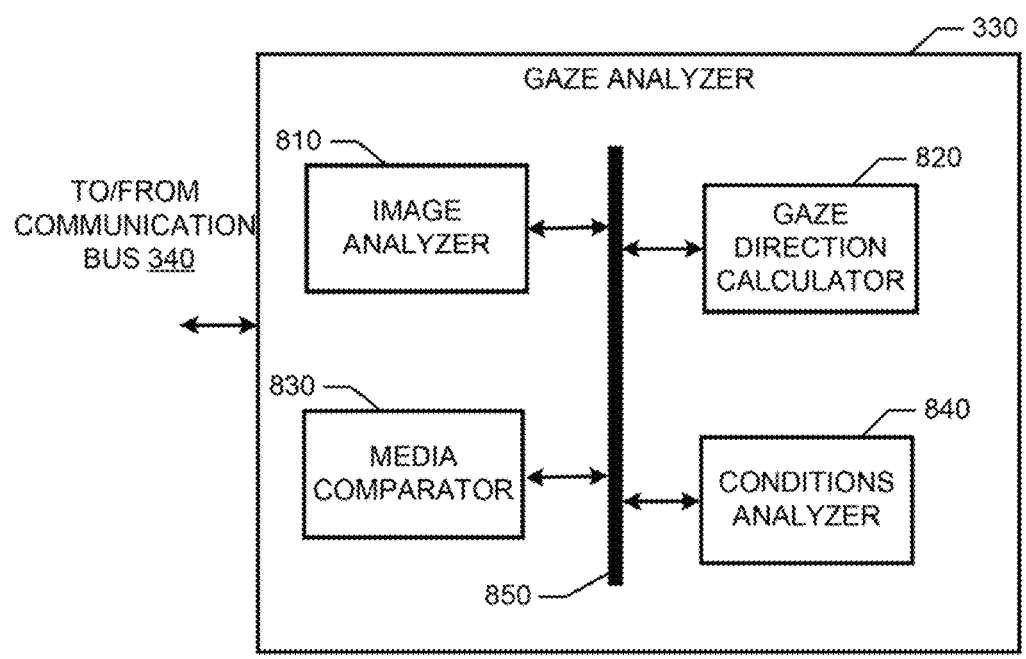
FIG. 8 is a block diagram of an example gaze analyzer that may be implemented by the gaze detector of FIGS. 1 and/or 3.

FIG. 8 is a block diagram of an example gaze analyzer 330 that may be used to implement the gaze analyzer 330 of FIG. 3. The gaze analyzer 330 of FIG. 8 determines a gaze direction of a user and/or a portion of media being viewed by a user using information from the reference frame manager 310 of FIGS. 3 and/or 5 and/or the image manager 320 of FIGS. 3 and/or 7. In the illustrated example of FIG. 8, the gaze analyzer 330 includes an image analyzer 810, a gaze direction calculator 820, a media comparator 830, and a conditions analyzer 840. In FIG. 8, a communication bus 350 facilitates communication between the image analyzer 810, the gaze direction calculator 820, the media comparator 830, and the conditions analyzer 840.

Figure 9A:
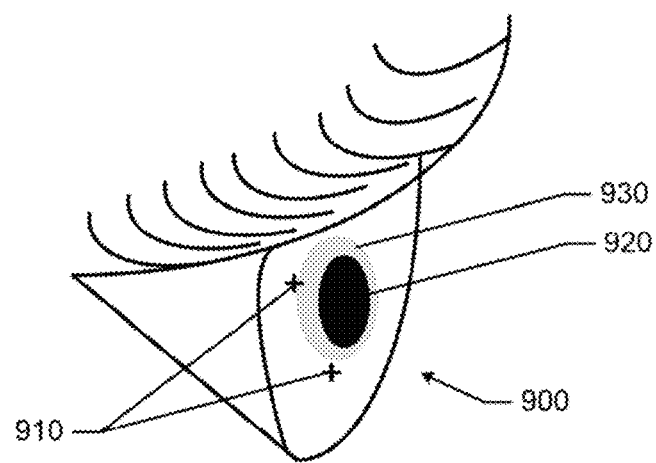
FIGS. 9A-9C illustrate example images of eye(s) of a user that may be analyzed by the gaze detector of FIGS. 1 and/or 3.
Figure 9B:
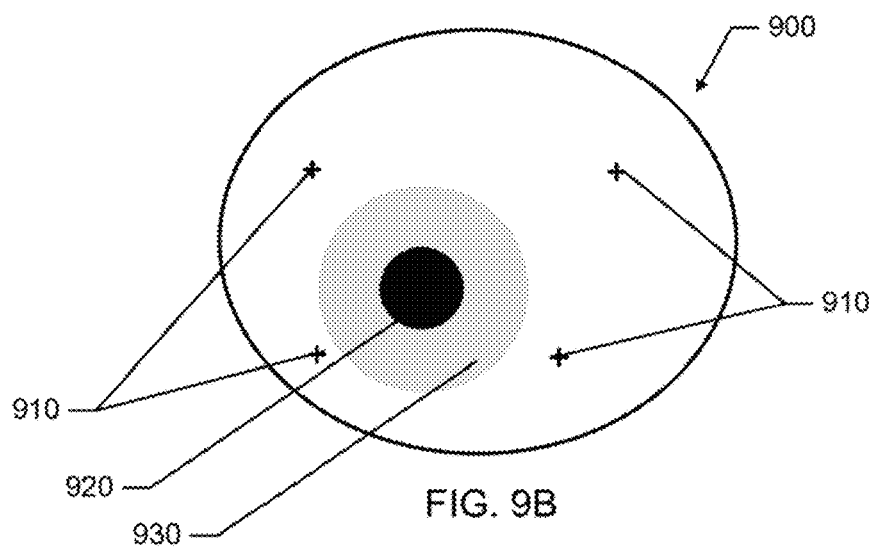
Figure 9C:
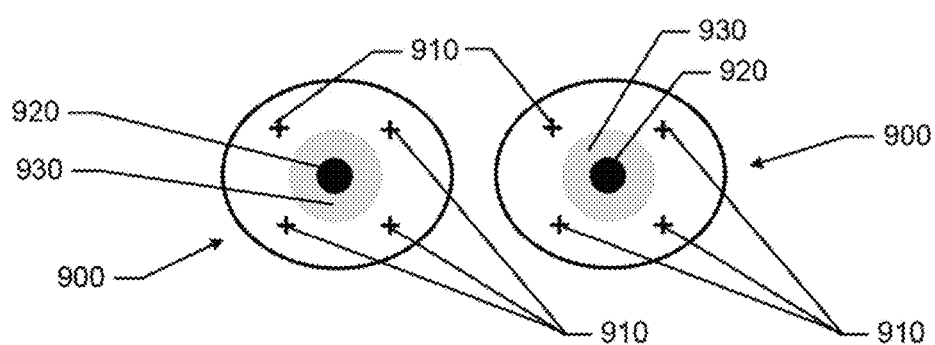

The image analyzer 810 of FIG. 8 analyzes images captured by the camera 140 and/or received from the image manager 320. The image analyzer 810 analyzes images to identify illumination points, reference points, and/or user characteristics. For example, the image analyzer 810 may identify illumination point(s) relative to a users pupil and/or iris. Referring now to FIGS. 9A-9C, the image analyzer 810 performs a focused analysis of a user's eye(s) 900 identified in images captured by the camera 140. In FIG. 9A, the image analyzer 810 identifies reflections of two illumination points 910 in an eye 900 of a user, a pupil 920, and an iris 930 of the user. In FIG. 9B, the image analyzer 810 identifies reflections of four illumination points 910, a pupil 920 of a user, and an iris 930 of the user. In FIG. 9C, the image analyzer 810 identifies eight illumination points 910, two pupils 920, and two irises 930 of a user. In the illustrated examples of FIGS. 9A-9C, illumination points 910 correspond to illumination points of a reference frame presented by a presentation device being viewed by the eye(s) 900 of the user (e.g., the presentation device 120). The image analyzer 810 may also identify and/or determine scale information from the images (e.g., based on settings of the camera, edits from the image manager 320, etc.). The image analyzer 310 may then provide coordinates of identified points of interest in the images and/or other image information to the gaze direction calculator 820. In some examples, the image analyzer 810 and/or gaze analyzer 330 may provide instructions to the camera 140 to increase a level of optical and/or digital zoom.

In some examples, the image analyzer 810 of FIG. 8 identifies conditions of an environment of a user and/or the gaze detection system 100. For example, the image analyzer 810 may receive a stream of images (e.g., video) from the camera 140 and/or the image manager 320 and identify characteristics of the environment. For example, the image analyzer 810 may identify contrast(s) in images (e.g., between reflected illumination points and the eye of a user, between identified objects of the image, etc.). Such examples are further described below in connection with the conditions analyzer 840.

The gaze direction calculator 820 in the illustrated example of FIG. 8 analyzes point(s) of interest identified in the images by the image analyzer 820 to calculate a gaze direction of a user. In some examples, the gaze direction calculator 820 identifies a reference frame corresponding to an image analyzed by the image analyzer 810 that was presented on the presentation device 120. Accordingly, in such examples, the gaze direction calculator 820 may compare the reference frame presented by the presentation device 120 and the reflection of the reference frame from the user in the analyzed image to determine the gaze direction. For example, the gaze direction calculator 820 may identify an illumination point pattern in the reference frame and the location of corresponding illumination points reflected in an eye of a user to determine the gaze direction of the user. Furthermore, the gaze direction calculator 820 uses features or reference points of a user (e.g., the user's eye(s) and/or eyewear), to determine a gaze direction. For example, the gaze direction calculator 820 may identify at least one reference point of a user (e.g., a user's pupil, a user's iris, etc.) to calculate the gaze direction based on the location of reflected illumination points relative to the reference point(s). In some examples, the gaze direction calculator 820 may account for the curvature of an eye and/or eyewear of a user. The gaze direction calculator may use various mathematical formulae to calculate the gaze direction and/or a location of presentation device using variables (e.g., distances between illumination points, reference points, etc.) determined from the images of the reflections disclosed herein.

Referring to FIGS. 4A and 9B as examples, assume that the presentation device 120 displays the reference frame 400A, and the camera 140 captured an image of the eye 900 of FIG. 9B including a reflection of the reference frame 400A. In such an example, the illumination points 410 of FIG. 4A correspond to the illumination points 910 of FIG. 9B. Accordingly, the gaze direction calculator 820, may determine that the eye 900 of FIG. 9B is gazing at an angle below and to the left of the camera 140 based on the location of the illumination points 910 relative to the pupil and/or iris 930 of the eye 910. The example gaze direction calculator 820 may provide gaze direction information to the media comparator 830 to determine a portion of the media that is being viewed by the user. In some examples, the gaze direction calculator 820 may calculate a corresponding location of the presentation device 120 based on the locations of the reflected illumination points in the analyzed images. For example, the gaze direction calculator 820 may translate the location of the illumination points 910 of FIG. 9 to a location on the reference frame 400A based on the locations of the illumination points 910 relative to the pupil 920 and/or the iris 930 of the eye 900. Thus, the gaze direction calculator 820 may calculate mathematic formulae based on the locations of the illumination points 910, the pupil 920, and/or the iris 930.

The media comparator 830 of the illustrated example of FIG. 8 determines a portion of media being viewed by a user. The media comparator 830 compares gaze direction information received from the gaze direction calculator 820 with media frames presented before or after a reference frame used to calculate the gaze direction. For example, the gaze analyzer 330, from the calculations of the gaze direction calculator 820, may determine a location of a reference frame that was being viewed by the user. The media comparator 830 may then compare the calculated location to a corresponding location of a media frame presented before or after the reference frame to determine the portion of the media being viewed.

Figure 10:
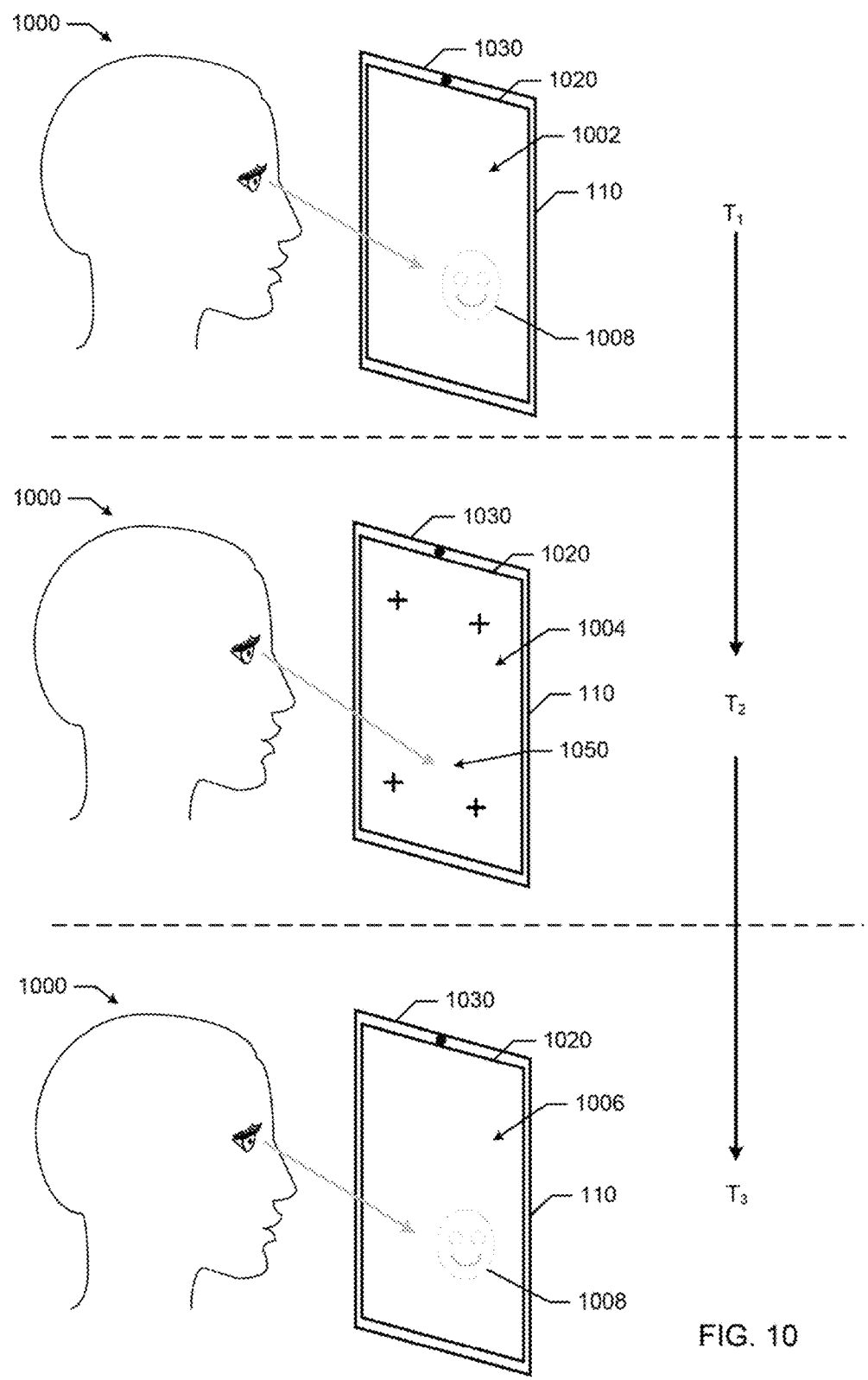
FIG. 10 illustrates a user viewing three example display frames that may be used by the gaze detector of FIGS. 1 and/or 3.

For an example analysis performed by the media comparator 830, FIG. 10 illustrates an example of a user 1000 viewing three sequential displayed frames 1002, 1004, 1006 on a presentation device 1020 of a media device 1030 (e.g., a tablet computer). The media device 1030 may include and/or be in communication with a gaze detector 110. In the example of FIG. 10, the first frame 1002 is presented at time $T_1$, the second frame 1004 is presented at time $T_2$, and the third frame is presented at time $T_3$, such that $T_1$ is before $T_2$ and $T_2$ is before $T_3$ in time. In the illustrated example of FIG. 10, the first frame 1002 is a media frame comprising an object 1008 (e.g., an image of a person) and the third frame 1006 is a media frame comprising the object 1008. However, the second frame 1004 is a reference frame including illumination points 1010. In FIG. 10, the media comparator 830 of the gaze detector 110 determines that the user 1000 was viewing the object 1008 based on an analysis of an image of the reference frame reflected in the user's eye indicating that the user 1000 was viewing a particular location 1050 of the presentation device 1020. Accordingly, because the object 1008 is presented in a same location of the presentation device 1020 viewed by the user when viewing the reference frame (though the user 1000 may not have known that he/she viewed the reference frame) the media comparator 830 can determine that the user was viewing the object 1008.

In some examples, the media comparator 830 of FIG. 8 may identify objects (e.g., icons, text, images, hyperlinks, buttons, tabs, etc.) at the corresponding location (e.g., the location 1050 of FIG. 10). In such examples, the gaze analyzer 330 and/or gaze detector 110 may provide information to a processor associated with the gaze detector 110 (e.g., the processor 1412 of FIG. 14) for control of a device. In some examples, such identified objects may be used to control the gaze detection system 100 and/or a device associated with the gaze detection system 100 (e.g., a computer, a tablet computer, a smartphone, etc.). For example, the gaze analyzer 330 may determine that a user has selected an object (e.g., based on a length of time the user views the object, based on a number of blinks while viewing the object, etc.).

The conditions analyzer 840 of FIG. 8 monitors conditions of an environment of the gaze detector 110 and/or a user. The example condition analyzer 840 may provide feedback to the reference frame manager 310 and/or image manager 320 to adjust corresponding settings for determining a gaze direction of a user and/or a portion of media being viewed by the user.

In some examples, the conditions analyzer 840 of FIG. 8 monitors a head location of a user. As used herein, a head location of a user refers to the location of the user's head in a headbox relative to the presentation device 120 and/or the camera 140. As used herein, a headbox is a viewing space relative to a presentation device (e.g., the presentation device 120) that can be captured by a camera (e.g., the camera 140). For example, the conditions analyzer 840 may perform motion detection and/or facial recognition based on images received and/or retrieved from the image manager 320 and/or the camera 140.

Figure 11A:
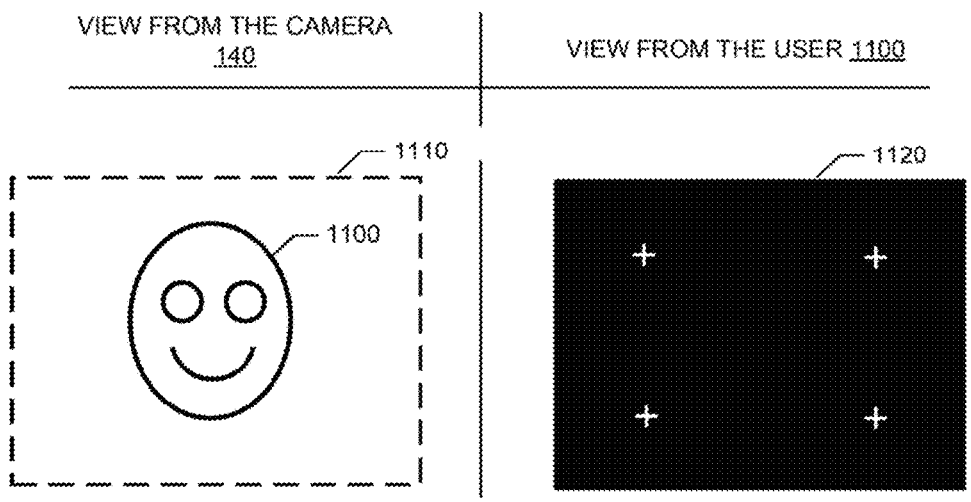
FIGS. 11A-11C illustrate example user head locations and corresponding reference frames that may be used by the gaze detector of FIGS. 1 and/or 3.
Figure 11B:
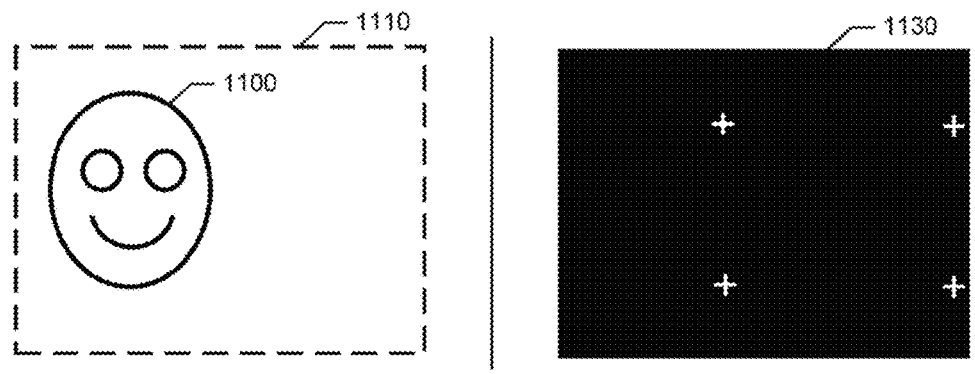
Figure 11C:
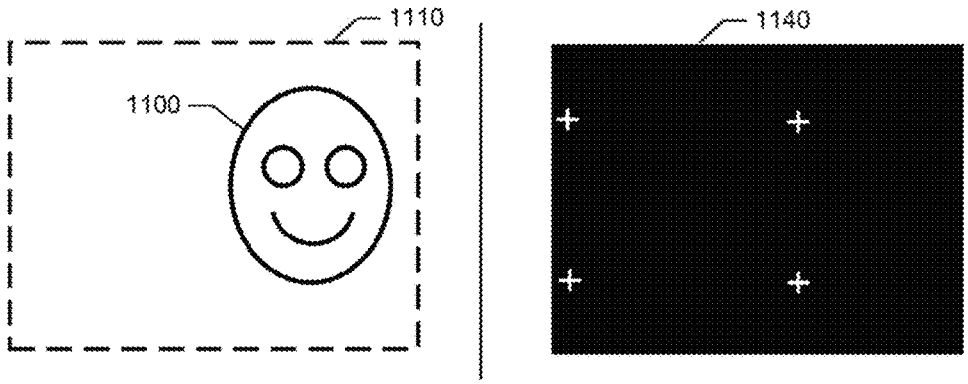

FIGS. 11A-11C illustrate an example analysis performed by the conditions analyzer 840 and corresponding reference frames generated by the reference manager 310 based on feedback from the conditions analyzer 840. In FIG. 11A, a user's head 1100 is located in the center of a headbox 1110.

Accordingly, in FIG. 11A, the reference frame manager 310, based on instructions from the conditions analyzer 840 and/or gaze analyzer 330, generates and inserts a first reference frame 1120 that includes centered illumination points 1130. In FIG. 11B, the user's head is shifted to the left side of the headbox 1110. Accordingly, in FIG. 11B, the reference frame manager 310 based on instructions form the conditions analyzer 840 and/or the gaze analyzer 330 indicating a corresponding shift in the head location, generates and/or inserts a second reference frame 1130 that includes illumination points shifted to the right of the reference frame 1130. In FIG. 11B, the illumination points are shifted to the right of the reference frame 1130 because the right side of the reference frame is the same physical side as the head location because of opposite perspectives of the user 1100 and the camera 140. In FIG. 11C, the user's head is shifted to the right side of the headbox 1110. Accordingly, in FIG. 11C, the reference frame manager 310, based on instructions form the conditions analyzer 840 and/or the gaze analyzer 330 indicating a corresponding shift in the head location, generates and/or inserts a third reference frame 1140 that includes illumination points shifted toward the left side of the reference frame 1140.

In some examples, the conditions analyzer 840 of FIG. 8 monitors ambient light of the environment of the gaze detector 110 and/or a user. For example, the conditions analyzer may identify contrasts (or lack thereof) between objects to determine that bright light or dark light is present in images from the image manager 320 and/or the camera 140. Based on the determined lighting, the conditions analyzer 840 may instruct the reference frame manager 310 to adjust settings of generated and/or inserted reference frames. For example, the conditions analyzer 840 and/or gaze analyzer 330 may determine that the reference frame manager 310 should generate and insert reference frames with different colored illumination points, different sized illumination points, and/or a different illumination point pattern.

Accordingly, the conditions analyzer 840 of FIG. 8 enables the gaze detector to dynamically adapt illumination point locations, colors, and/or patterns to account for conditions of an environment of a user and/or the gaze detector 110. In some examples, after each reference frame is identified in a reflection of a user by the gaze detector 110, the conditions analyzer 840 may determine whether settings are to be adjusted for subsequent reference frames based on the analyzed conditions of the environment. In some examples, the conditions analyzer 840 continuously monitors images streamed from the image manager 320 and/or the camera 140 to analyze the conditions of the environment.

While an example manner of implementing the gaze analyzer 330 of FIG. 3 is illustrated in FIG. 8, at least one of the elements, processes and/or devices illustrated in FIG. 8 may be combined, divided, re-arranged, omitted, eliminated and/or implemented in any other way. Further, the image analyzer 810, the gaze direction calculator 820, the media comparator 830, the conditions analyzer 840 and/or, more generally, the example gaze analyzer 330 of FIG. 8 may be implemented by hardware, software, firmware and/or any combination of hardware, software and/or firmware. Thus, for example, any of the image analyzer 810, the gaze direction calculator 820, the media comparator 830, the conditions analyzer 840 and/or, more generally, the example gaze analyzer 330 could be implemented by at least one of analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the image analyzer 810, the gaze direction calculator 820, the media comparator 830, and/or the conditions analyzer 840 is/are hereby expressly defined to include a tangible computer readable storage device or storage disk such as a memory, a digital versatile disk (DVD), a compact disk (CD), a Blu-ray disk, etc. storing the software and/or firmware. Further still, the example gaze analyzer 330 of FIG. 8 may include at least one element, process and/or device in addition to, or instead of, those illustrated in FIG. 8, and/or may include more than one of any or all of the illustrated elements, processes and devices.

Accordingly, the gaze detector 110 disclosed in connection with FIGS. 1, 3, 5, 7, and/or 8 may determine a gaze direction of a user and/or a portion of media being viewed by a user. In some examples, the gaze detector 110 may be used for control of a device (e.g., a computer, a tablet computer, a smartphone, etc.) associated with and/or communicatively coupled with the gaze detector 110.

Figure 12:
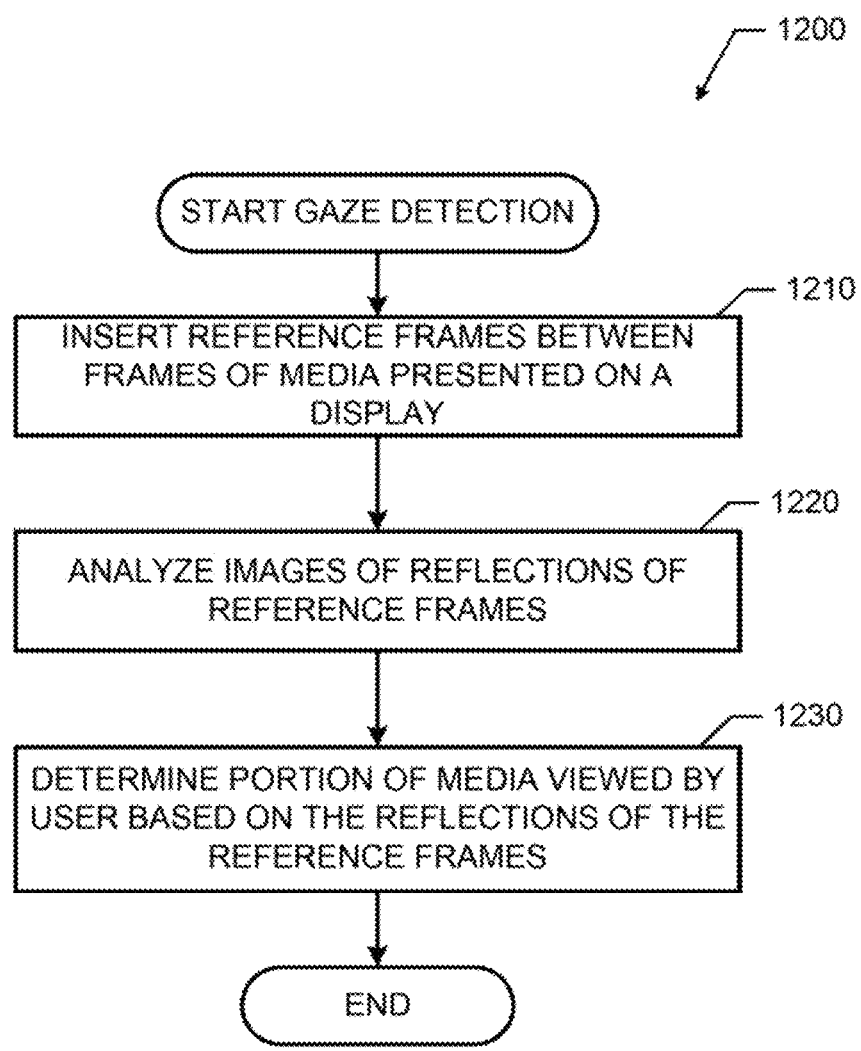
FIG. 12 is a flowchart representative of example machine readable instructions that may be executed to implement the gaze detector of FIGS. 1 and/or 3 and/or elements of the gaze detector of FIGS. 5, 7, and/or 8.

Flowcharts representative of example machine readable instructions for implementing the gaze detector 110 of FIG. 3 and/or the elements of the gaze detector 110 of FIGS. 5, 7, and/or 8 are shown in FIGS. 12 and/or 13. In these examples, the machine readable instructions comprise program(s) for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIGS. 12 and/or 13, many other methods of implementing the example the gaze detector 110 of FIG. 3 and/or the elements of the gaze detector 110 of FIGS. 5, 7, and/or 8 may alternatively be used. For example, the order of execution of the blocks may be changed, and/or some of the blocks described may be changed, eliminated, or combined.

A program 1200 of FIG. 12 begins with an initiation of the gaze detector 110 of FIGS. 1 and/or 3 (e.g., in response to instructions from a user, in response to startup, in response to powering on a device associated with and/or including the gaze detector 110, etc.). The program 1200 is executed to detect a gaze direction of a user and/or determine a portion of media being viewed by the user.

At block 1210 of the illustrated example of FIG. 12, the example reference frame manage 310 of FIGS. 3 and/or 5 inserts a reference frames between frames of media presented on a display. The reference frames of block 1210 are presented on a presentation device (e.g., the presentation device 120) between the media frames. As disclosed herein, images of the reference frames reflect from a user, and at block 1220, the gaze analyzer 330 analyzes the images of the reflections of the reference frames.

At block 1230 of FIG. 12, the gaze analyzer 1230 determines a portion of media viewed by a user based on the reflections of the reference frames. As disclosed herein, the gaze analyzer 1230 may determine the portion of media based on a calculated gaze direction of a user and/or comparing the gaze direction to media frames presented before and/or after the reference frames block 1210 of FIG. 12.

In some examples, the program 1200 of FIG. 12 may be iteratively executed to implement the gaze detector 110 of FIGS. 1 and/or 3. For example, a first iteration of the program 1200 may include inserting a first reference frame at block 1210, an analysis of a first image of a reflection of the first reference frame at block 1220, and a first determination at block 1230 based on the first image. In such an example, a second iteration of the program 1200 may include inserting a second reference frame at block 1210, an analysis of a second image of a reflection of the second reference frame at block 1220, and a second determination at block 1230 based on the second image. Accordingly, the iterations of the program 1200 may be used to continuously monitor a gaze direction of a user and/or monitor a portion of media being viewed by the user.

Figure 13:
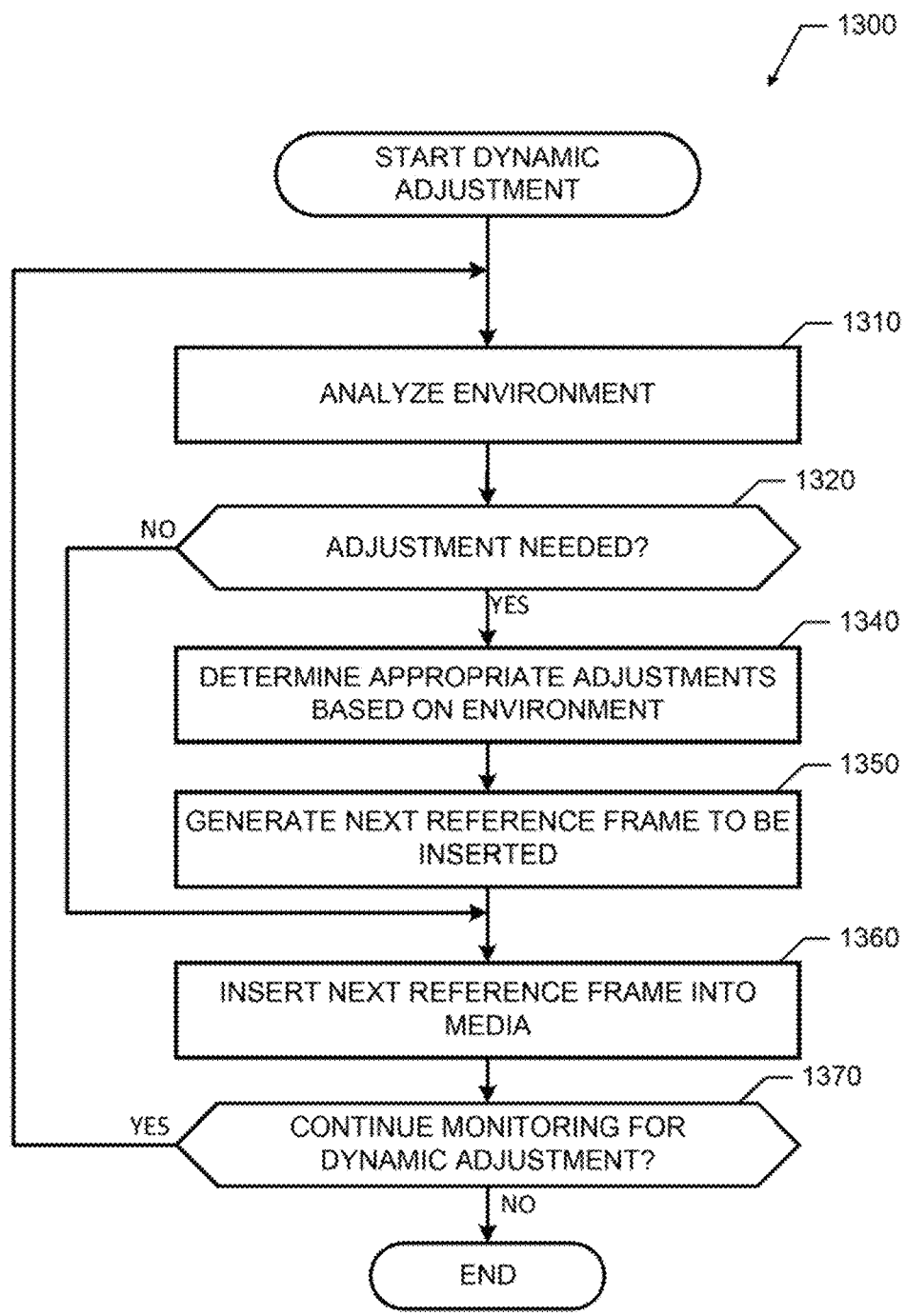
FIG. 13 is another flowchart representative of example machine readable instructions that may be executed to implement the gaze detector of FIGS. 1 and/or 3 and/or the gaze detector elements of FIGS. 5, 7, and/or 8.

Another program 1300 of FIG. 13 begins with an initiation of the gaze detector 110 of FIGS. 1 and/or 3. The program 1300 of FIG. 13 enables the gaze detector 110 to monitor an environment and dynamically adjust settings of the gaze detector 110. For example, the program 1300 may be executed in accordance with the camera 140 recording/monitoring an environment of the gaze detection system 100 to determine settings of the gaze detection system 100 that may increase accuracy of determining a gaze direction of a user and/or determining a portion of media being viewed by a user. The program 1300 of FIG. 13 may be executed before, after, and or simultaneously with the program 1200 of FIG. 12. In some examples, the program 1300 of FIG. 13 may be executed between iterations of the program 1200 of FIG. 12.

At block 1310, conditions analyzer 840 analyzes an environment of the gaze detector 110. The example environment of block 1310 may be analyzed via an image of the environment captured by the camera 140. In some examples, the analyzed image of block 1310 is an image received from the image manager 320 including a reflection of a reference frame from a user. In some examples, the analyzed image of block 1310 may be an image of a video stream captured by the camera 140 and/or received from the image manager 320. For example, at block 1310, the conditions analyzer 840 may determine a head location of a user and/or lighting conditions of the environment.

At block 1330, the conditions analyzer 840 determines whether an adjustment to the gaze detector 110 is needed based on the analyzed environment. For example, at block 1330, the conditions analyzer 840 may determine that a gaze detection cannot be made based on the conditions of the environment (e.g., a head location is preventing accurate gaze detection, and/or light conditions are preventing being able to identify illumination points reflected in the user's eye(s), etc.). In some examples, at block 1330, the conditions analyzer 840 determines whether adjustments need to be made based on contrasts of the images and/or analysis of previous images. If the conditions analyzer 840 determines that no adjustment is needed, control advance to block 1360. If, at block 1320, the conditions analyzer 840 determines that an adjustment is needed, the conditions analyzer 840 and/or the gaze analyzer 330 determines appropriate adjustments for the gaze detector 110 based on the analyzed environment (block 1340). Examples of adjustments to be made to the gaze detector 110 include, but are not limited to, adjusting settings of the next reference frame (e.g., illumination point pattern, illumination point location, illumination point color, illumination point size, background color, etc.) that is to be inserted in the media by the reference frame manager 310 and captured by the camera 140, adjusting camera settings (e.g., motion detection, facial recognition, zoom, focus, color affects, etc.) of the camera 140 signaling a user to adjust settings.

At block 1350, the reference frame manager 310 generates the next reference frame to be inserted into the media. In some examples, at block 1350, the next reference frame generated is adjusted (e.g., a different illumination point pattern, different illumination point location, etc.) based on the determined appropriate adjustments of block 1340. In some examples, the next frame generated is not substantially altered from a previous reference frame generated by the reference frame manage 310. At block 1360, the reference frame manager 310 inserts the next reference frame into the media, as disclosed herein.

In the illustrated example of FIG. 13, the gaze detector 110 determines whether it is to continue monitoring for dynamic adjustment. If the gaze detector 110 is to continue monitoring for dynamic adjustment, control returns to block 1310. If, at block 1370, the gaze detector 110 is not to continue monitoring for dynamic adjustment (e.g., based on user instructions, a shutdown of the gaze detector, etc.), the program 1300 ends.

As mentioned above, the example processes of FIGS. 12 and/or 13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 12 and/or 13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Furthermore, as used herein, the use "a" or "an" may imply "at least one."

Figure 14:
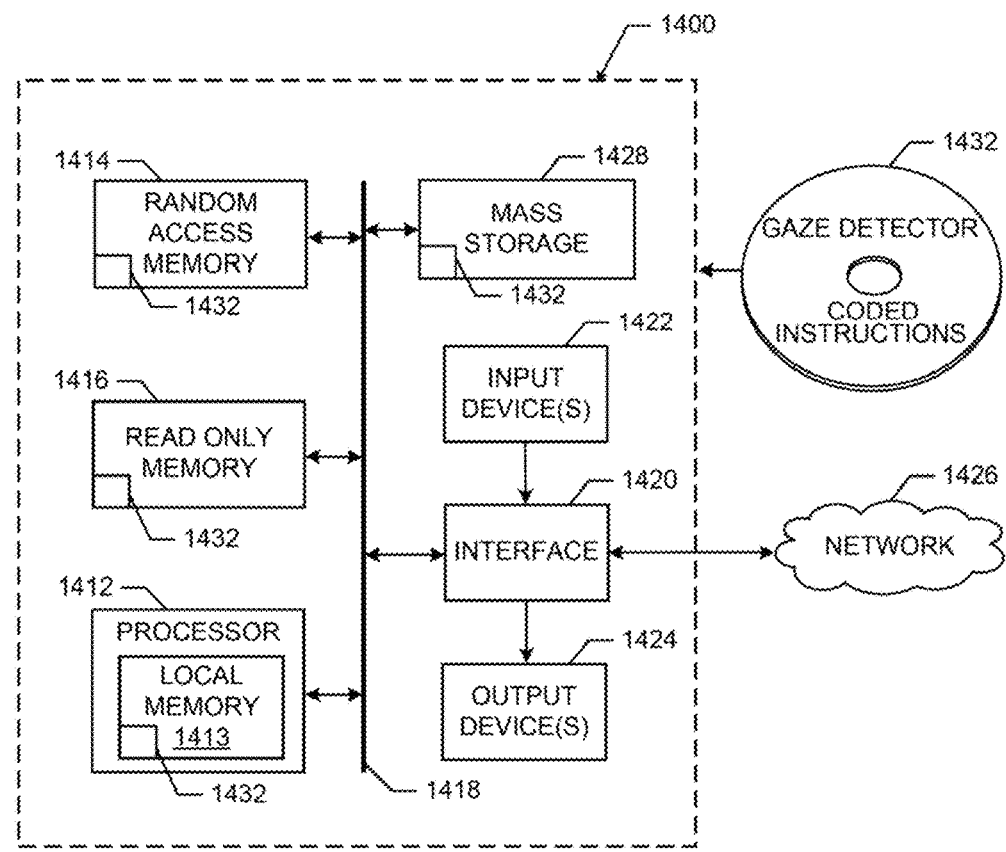
FIG. 14 is a block diagram of a processor platform capable of executing the instructions of FIGS. 12 and/or 13 to implement the gaze detector 110 of FIGS. 1 and/or 3 and/or the gaze detector elements of FIGS. 5, 7, and/or 8.

FIG. 14 is a block diagram of an example processor platform 1400 capable of executing the instructions of FIGS. 12 and/or 13 to implement the gaze detector 110 of FIGS. 1 and/or 3 and/or the gaze detector elements of FIGS. 5, 7, and/or 8. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example of FIG. 14 includes a processor 1412. The processor 1412 of the illustrated example is hardware. For example, the processor 1412 can be implemented by at least one integrated circuit, logic circuit, microprocessor or controller from any desired family or manufacturer.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, at least one input device 1422 is connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 1424 is also connected to the interface circuit 1420 of the illustrated example. The output device(s) 1424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1420 of the illustrated example, thus, typically includes a graphics driver card a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes at least one mass storage device 1428 for storing software and/or data. Examples of such mass storage device(s) 1428 include floppy disk drives, hard drive disks, compact disk drives, Blu-ray disk drives, RAID systems, and digital versatile disk (DVD) drives.

The coded instructions 1432 of FIGS. 12 and/or 13 may be stored in the mass storage device 1428, in the local memory 1413 in the volatile memory 1414, in the non-volatile memory 1416, and/or on a removable tangible computer readable storage medium such as a CD or DVD.

From the foregoing, it will be appreciated that the above disclosed methods, apparatus, and articles of manufacture provide a gaze detection system and/or gaze detector that utilizes reference frames interlaced with media frames to determine a gaze direction and/or a portion of media being viewed by a user. Furthermore, examples disclosed herein provide for dynamically adjusting illumination points for use in determining a gaze direction of a user based on conditions of an environment and/or a position of a user as disclosed herein. Accordingly, the gaze detector disclosed herein may achieve increased accuracy in identifying a user's gaze direction using a presentation device presenting reference frames and images of reflections of the reference frames captured by a camera rather than using fixed illumination points (and corresponding fixed illumination point hardware) and/or head mounted illumination point units.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a processing platform including a hardware processor; and
 a memory resource storing machine readable instructions to cause the hardware processor to:
  insert, by a reference frame manager, reference frames into media, the reference frames include a plurality of illumination points and present at a first frequency between media frames of the media, and wherein the illumination point comprises a shape that is a different color than a primary color of the reference frames;
  identify, by an image manager, images captured by a camera included on the processing platform, the images comprising reflections of the reference frames from a user;
  determine, by a gaze analyzer, a portion of the media that is being viewed by the user based the images of the reflections, and
  adjust a setting of the reference frames after each frame has been analyzed based on the portion of the media being viewed.

2. The apparatus as defined in claim 1, wherein the reflections are reflected from an eye of the user, or an eyewear of the user, or combinations thereof.

3. The apparatus as defined in claim 1, wherein the gaze analyzer is further to:
 identify a location of the plurality of illumination points in the images of the reflections of the reference frames; and
 compare the location to a reference point of the user to determine a gaze direction of the user.

4. The apparatus as defined in claim 1, wherein the gaze analyzer is to determine the portion of the media that is being viewed by:
 determining a location of a first reference frame viewed by the user based on an analysis of a first image of the first reference frame reflected from the user; and
 comparing the determined location of the reference frame to a location of a first media frame comprising the portion of the media being viewed.

5. The apparatus as defined in claim 1, wherein the camera captures the images at a second frequency that is higher than the first frequency.

6. The apparatus as defined in claim 1, wherein the reference frame manager is further to:
  analyze the media; and
  identify media reference frames within the media, the media reference frames comprising media frames having images of objects that act as illumination points.

7. The apparatus as defined in claim 1, wherein the gaze analyzer is further to analyze conditions of an environment of the user; and
  the reference frame manager is to adjust settings of illumination points within the reference frame based on the conditions of the environment.

8. The apparatus as defined in claim 7, wherein the settings of the illumination points comprise, a location of the illumination points, a pattern of the illumination points, a size of the illumination points, a shape of the illumination points, a color of the illumination points, a wavelength of the illumination points, or combinations thereof.

9. The apparatus as defined in claim 7, wherein the conditions of the environment comprise, a location of the user, ambient light conditions, a head location of the user relative to the display, or combinations thereof.

10. A method executable by a processing platform including a hardware processor to execute machine readable instructions stored on a memory resource, the method comprising:
  inserting reference frames between frames of media presented on a display at a first frequency;
  analyzing images of reflections of the reference frames;
  determining a portion of the media that is being viewed by a user based on the reflections of the reference frames from a user;
  determining a gaze condition based on the images;
  repeating an adjustment of a setting of the reference frames after analyzing each frame based on the gaze condition to increase an accuracy of determining the portion of the media that is being viewed; and
  adjusting the reference frames based on the adjusted settings determining the portion of media being viewed.

11. The method as defined in claim 10, further comprising:
  identifying the portion of the media by determining a portion of the reference frame viewed by the user, the portion of the reference frame being located in a location of the reference frame corresponding to a location of the portion of the media within a media frame.

12. A non-transitory computer readable storage medium comprising instructions that, when executed, cause a processing platform including a hardware processor to:
  insert a reference frame between a first and a second media frame of media being presented on a display of the processing platform, the reference frame comprising a plurality of illumination points;
  analyze an image received from a camera of the processing platform to identify a reflection of the reference frame in an eye of the user;
  determine a gaze condition based on the image;
  analyze each frame based on the gaze condition to increase an accuracy of determining the portion of the media that is being presented;
  adjust a setting of the reference frame after each frame has been analyzed, based on the gaze condition;
  determine a first gaze direction of the user based on a location of the plurality of illumination points relative to the eye of the user identified in the reflection; and
  adjust the reference frame after each frame has been analyzed, based on the gaze condition.

13. The non-transitory computer readable storage medium of claim 12, wherein the instructions, when executed, further cause the processing platform including a hardware processor to:
  identify a location of a head of the user; and
  position the plurality of illumination points in the reference frame based on the location of the head of the user.

* * * * *

UNITED STATES PATENT AND TRADEMARK OFFICE
CERTIFICATE OF CORRECTION

PATENT NO.        : 9,983,668 B2
APPLICATION NO.   : 15/303546
DATED             : May 29, 2018
INVENTOR(S)       : Harold Merkel et al.

Page 1 of 1

It is certified that error appears in the above-identified patent and that said Letters Patent is hereby corrected as shown below:

In the Drawings

In FIG. 5, sheet 5 of 14, reference numeral 510, Line 2, delete "ANALZYER" and insert -- ANALYZER --, therefor.

In the Claims

In Column 18, Line 40, Claim 1, after "based" insert -- on --.

Signed and Sealed this
Ninth Day of October, 2018

Andrei Iancu
*Director of the United States Patent and Trademark Office*